United States Patent
Watanabe (10) Patent No.: US 6,317,854 B1
(45) Date of Patent: Nov. 13, 2001

(54) APPARATUS, AND ASSOCIATED METHOD, FOR SELECTING RETRANSMISSION OF PACKET DATA

(75) Inventor: Fujio Watanabe, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/312,560

(22) Filed: May 14, 1999

(51) Int. Cl.$^7$ ...................................................... H04L 1/18

(52) U.S. Cl. ............................................................. 714/749

(58) Field of Search .................................. 714/749, 748, 714/750, 751

(56) References Cited

U.S. PATENT DOCUMENTS

| | | | |
|---|---|---|---|
| 3,754,211 | * 8/1973 | Rocher et al. ........................ | 714/749 |
| 4,549,297 | * 10/1985 | Nishimoto ............................. | 714/749 |
| 4,841,527 | * 6/1989 | Raychaudhuri et al. ............. | 714/748 |
| 5,345,594 | * 9/1994 | Tsuda .................................... | 455/18 |
| 5,430,738 | * 7/1995 | Tsuda .................................... | 714/748 |
| 5,610,595 | * 3/1997 | Garrabrant et al. ............. | 340/825.52 |
| 5,818,852 | * 10/1998 | Kapoor ................................. | 714/749 |
| 6,073,266 | * 6/2000 | Ahmed et al. ........................ | 714/749 |
| 6,079,036 | * 6/2000 | Moharram ............................ | 714/712 |
| 6,134,692 | * 10/2000 | Sekiya et al. ........................ | 714/749 |

FOREIGN PATENT DOCUMENTS

02000332729-A* 11/2000 (JP) ................................ H04J/13/04

OTHER PUBLICATIONS

J.H. Sarker, S.J. Halme, "The prudence transmission method (PTM I): a retransmission cut–off method for contention based multiple–access communication systems", This paper appears in: IEEE 47th Vehicular Technology Conference, 1997, On page(s): 397–401.*

J.H. Sarker, S.J. Halme, "The prudence transmission method II (PTM II): on the maximum and minimum values of retransmission cut–off method for slotted ALOHA", This paper appears in: IEEE 47th Vehicular Technology Conference, 1998, On page(s): 1315–1320.*

M.S. Alam, A.Z.M.E. Hossain, "Throughput analysis of a multichannel slotted–ALOHA protocol in short–haul communication environment for an exponential backoff retransmission scheme", This paper appears in: Information, Proceedings of 1997 International Conf.*

S. Keshav, S.P. Morgan, "SMART retransmission: performance with overload and random losses", This paper appears in: INFOCOM '97. Proceedings IEEE Sixteenth Annual Joint Driving the Information Revolution Conference of the IEEE Computer and Communications S.*

A.Z.M. Ekram Hossain, J.H. Sarker, "On throughput performance of single and multichannel S–ALOHA with exponential backoff retransmission schemes for packet transmissions in multiple power levels" This paper appears in: 1997 IEEE International Conference on.*

* cited by examiner

Primary Examiner—Albert Decady
Assistant Examiner—Joseph D. Torres (57) ABSTRACT

An apparatus, and an associated method, for scheduling when to retransmit a packet of data in a packet data communication system. Data is scheduled to be retransmitted according to a retransmission probability in the absence of a feedback acknowledgment indicating successful transmission of the packet of data. In one implementation, the apparatus forms a portion of a mobile terminal operable in a BRAN (Broadband Radio Access Network). Data throughput rates are increased by selecting retransmission of a packet of data is made with a retransmission probability if no feedback acknowledgment indicating successful indication of the packet of data has been completed.

20 Claims, 9 Drawing Sheets

APPARATUS, AND ASSOCIATED METHOD, FOR SELECTING RETRANSMISSION OF PACKET DATA

The present invention relates generally to the communication of packet data upon a random access channel defined in a communication system, such as a wireless LAN (local area network). More particularly, the present invention relates to apparatus, and an associated method, for selecting whether and when to retransmit a packet of data according to a retransmission probability. Operation of an embodiment of the present invention improves data throughput and delay performance by permitting retransmission of the packet of data without waiting for a feedback acknowledgment indicating whether a prior transmission of the packet had been successfully communicated.

BACKGROUND OF THE INVENTION

Advancements in communication technologies have permitted the introduction of, and popularization of, new types of communication systems. As a result of such advancements, the rate of data transmission and the corresponding amount of data, permitted to be communicated in such communication systems, has increased.

A radio communication system is representative of a type of communication system which has benefited from advancements in communication technologies. A radio communication system inherently permits an increase in communication mobility as communication channels defined in such a system are formed of radio channels and do not require wireline connections for their formation. A radio communication system, however, typically is bandwidth-limited. That is to say, a frequency bandwidth permitted to be utilized in a radio communication system is regulated by regulatory bodies. Generally, only a limited amount of the electromagnetic spectrum is allocated for usage by a particular radio communication system. Because the spectrum allocation for use by a particular system is limited, communication capacity increase of a radio communication system is sometimes limited by such allocation. Increase of the communication capacity of the radio communication system, therefore, is sometimes only possible if the efficiency by which the allocated spectrum is used is increased.

Digital communication techniques, for instance, provide a manner by which to increase the bandwidth efficiency of communications in a communication system. The use of digital communication techniques is particularly advantageously implemented in a radio communication system due to the particular needs to efficiently utilize the spectrum allocated to such a system.

When digital communication techniques are used, information which is to be communicated is typically digitized. In one technique, the digitized information is formatted into packets, and the packets are communicated to effectuate the communication. Individual ones, or groups, of the packets of data can be communicated at discrete intervals and, once communicated, concatenated together to recreate the informational content contained therein.

Because packets of data can be communicated at discrete intervals, a communication channel need not be dedicated solely for the communication of packet data generated by one sending station to one receiving station as conventionally required in circuit-switched communications. Instead, a single channel can be shared amongst a plurality of different sending and receiving station-pairs. Because a single channel can be utilized to effectuate communications by the plurality of pairs of communication stations, improved communication capacity is possible.

In some digital communication systems, a random access channel is defined upon which to permit the communication of the packet of data. A sending station which is to send a packet of data is permitted random access to the random access channel. While such a scheme advantageously provides a simple manner by which to effectuate communication of packets of data, lack of coordination between separate sending stations might result in two sending stations attempting to transmit a packet of data at the same time. In such an occurrence, referred to as a collision, the packets of data transmitted at the overlapping times by the separate communication stations, interfere with one another to prevent successful communication of either packet of data.

A slotted-ALOHA technique is an existing, random access protocol by which to communicate packet data on a random access channel. In such protocol, when a packet of data is successfully communicated to a receiving station, the receiving station returns a feedback acknowledgment to the sending station to inform the sending station of the successful communication of the packet of data. If, also, a determination is made at the receiving station of inadequate communication of the packet data due to a collision condition or other errors resulting from transmission of the packet on the random access channel, the feedback acknowledgment returned to the sending station indicates an unsuccessful transmission. Responsive to a feedback acknowledgment of an unsuccessful transmission, the packet is caused to be retransmitted by the sending station.

Back-off schemes, such as a binary exponential back-off scheme, have been implemented to minimize the occurrence of collisions by exploiting the feedback acknowledgments returned by a receiving station. Back-off schemes generally provide an improved manner of effectuating retransmission of packets of data from such sending stations. A sending station, also referred to herein as a terminal, is referred to as being backlogged if a prior transmission of the packet of data is not successfully received at a receiving station.

Packet data communications are effectuated, for instance, in conventional LANs (local area networks). Wireless networks, operable in manners analogous to, wired LANs have also been developed and are utilized to communicate packets of data over a radio link upon which a random access channel is defined.

For example, a broadband radio access network (BRAN) standard promulgated by the ETSI sets forth a standard for operation of a wireless LAN operable in the 5 GHz range. In this standard, a medium access control (MAC) frame structure is defined. The MAC frame structure includes a BCH (broadcast channel), a DLCH (down-link channel), an ULCH (up-link channel), and a RACH (random access channel). An IBCH (inband control channel) is sometimes defined upon the BCH or upon the DLCH. The IBCH is a logical channel. In the system defined by BRAN, as well as other wireless LANs, mobile terminals are utilized by users of the network to effectuate telephonic communications. The telephonic communications include, for example, voice as well as data, communications.

In the system defined by the BRAN standard, a mobile terminal transmits packets of data to an access point (AP) on the random access channel. The access point forms a portion of the infrastructure of the LAN. If a determination is made that the packet is successfully communicated to the infrastructure, the access point responds with a feedback acknowledgment indicating the successful delivery of the packet. If, conversely, a collision condition or other error resulting in unsuccessful transmission occurs, the access points return a feedback acknowledgment indicating the occurrence of the unsuccessful transmission.

Determination at the infrastructure of whether the transmission of the packet of data is successful requires processing at the infrastructure, such as to decode the received packet. Such processing requires a time period, i.e., processing time, which corresponds to a time period which may exceed that of the time period within which a MAC frame is formed. The feedback acknowledgment is returned to the mobile terminal, e.g., on the broadcast channel an IBCH (inband control channel) or first portion of the MAC, or other, frame. And, because of the processing time, together with the requirement that the feedback acknowledgment be formatted to be transmitted in the broadcast, or other appropriate, channel, the mobile terminal does not receive an immediate acknowledgment as to whether or not the prior transmission of the packet has been successfully completed. That is to say, the feedback acknowledgment is returned to the mobile terminal in a frame subsequent to the frame in which the packet is transmitted. In a conventional protocol, the mobile terminal retransmits the packet of data subsequent to detection of a feedback acknowledgment indicating unsuccessful transmission of the packet.

The existing requirements limit the data throughput rates as the feedback is required to be detected at the mobile terminal prior to retransmitting a packet of data. If a manner could be provided by which to more quickly select when to retransmit a packet of data, the data throughput rate of the communication system could be improved.

It is in light of this background information related to the communication of packet data that the significant improvements of the present invention have evolved.

SUMMARY OF THE INVENTION

The present invention, accordingly, advantageously provides apparatus, and an associated method, for selecting when to retransmit a packet of data at a sending station of a packet data communication system according to a retransmission probability. Selection is made to retransmit the packet of data, according to the retransmission probability, in the absence of detection at the sending station, of a feedback acknowledgment indicating successful communication of the prior transmission of the packet of data. Because delay conventionally required to wait for detection of a feedback acknowledgment is obviated, improvement of system throughput and delay performance is achievable.

In one aspect of the present invention, apparatus is provided for a sending station of a two-way multi-user communication system in which any of a plurality of sending stations transmits packets of data upon a shared channel to a receiving station. The receiving station is operable at least to return a feedback acknowledgment to the sending station to indicate successful communication of the packet data to the receiving station and also, alternately, to indicate unsuccessful communication of the packet data, due, e.g., to a collision condition in the event that two or more sending stations have transmitted a packet of data upon the shared channel during, an overlapping time period, resulting in a collision of the packets of data or another error condition resulting in the unsuccessful communication of the packet of data. During operation of an embodiment of the present invention, subsequent to initial transmission of the packet of data, and in the absence of detection at the sending station of a feedback acknowledgment acknowledging successful completion of communication of the packet of data to the receiving station, retransmission of the packet of data is selectably permitted according to a retransmission probability $\sigma$. Because retransmission of the packet of data is selectably permitted prior to detection of a feedback acknowledgment, delay conventionally associated with requiring the sending station first to detect a feedback acknowledgment prior to retransmitting the packet of data is obviated. In a further embodiment, subsequent to detection of a feedback acknowledgment indicating unsuccessful communication, the sending station is further also caused to retransmit the packet of data with a retransmission probability p.

In one implementation, the value of the retransmission probability $\sigma$ is selectable pursuant to a level of service attributed to the sending station. That is to say, a higher value of the retransmission probability $\sigma$ is associated with the sending station to increase the probability of retransmission of the packet data at an increased rate. By increasing the rate at which the packet of data is retransmitted, the likelihood of successful communication of the packet of data to the receiving station more quickly is increased.

In another aspect of the present invention, apparatus, and an associated method, is provided to a mobile terminal operable to communicate packet data in a radio communication system. The radio communication system is a multi-user communication system in which a plurality of mobile terminals operate to communicate packet data. The packet data is transmitted upon a random access channel upon which any of the mobile terminals are permitted random access to communicate packets of data thereon. Because of the shared nature of the random access channel, packets of data transmitted upon the random access channel are susceptible to collision. Such occurrence is referred to as a collision condition. Because a collision condition prevents successful effectuation of communication of the packet of data, the packet of data must be retransmitted. Other error conditions, caused, e.g., by channel fading or multipath distortion, might also occur, also to prevent successful communication of the packet of data. Subsequent to initial transmission of the packet of data, the mobile terminal which transmitted the packet of data permits retransmission of the packet of data according to a retransmission probability $\sigma$. The packet of data is retransmitted according to this probability of retransmission until a feedback acknowledgment is received at the mobile terminal indicating successful completion of transmission of the packet of data. Because retransmission of the packet of data is permitted to occur prior to receiving an indication of unsuccessful communication, the delay conventionally associated with requiring the mobile terminal to await detection of the feedback acknowledgment prior to permitting retransmission of the packet of data is obviated. A second retransmission probability p is also associated with the mobile terminal. Subsequent to detection at the mobile terminal of a feedback acknowledgment indicating a unsuccessful communication, retransmission of the packet of data is also permitted at a retransmission probability p. Thereby, retransmission of the packet of data occurs at both a probability $\sigma$ and at a probability p until a feedback acknowledgment indicating successful completion of communication of the packet of data is detected at the mobile terminal.

In another aspect of the present invention, a mobile terminal is provided for a wireless LAN (local area network), such as that defined in the ETSI-promulgated BRAN (broadband radio access network) standard for a 5 GHz, wireless LAN. In the system defined therein, a TDD (time division duplex) communication scheme is utilized. A random access channel is defined and mobile terminals operable in such a system transmit packet data upon the random access channel. Packets of data are communicated to an access point (AP) which forms a portion of the infrastructure of the wireless LAN. Feedback acknowledgments are returned by the AP to the mobile terminal at a first portion of a MAC (medium access control) frame, such as upon a broadcast channel which forms a portion of a MAC frame. Subsequent to transmission of the packet of data by a mobile terminal, selection is made to retransmit the packet of data according to a retransmission probability σ until a feedback acknowledgment detected at the mobile terminal indicates successful reception at the infrastructure of the prior transmission of the packet of data. The retransmission probability σ is a subscription-related parameter in which different values of σ can be associated, e.g., with different mobile terminals or, e.g., different communication services provided by a single mobile terminal. A higher value of the retransmission probability σ is accorded to a mobile terminal to increase the probability that a packet of data shall be successfully communicated to the infrastructure more quickly. The value of the retransmission probability σ, in one implementation, is down-loaded to the mobile terminal, such as during registration procedures. In another implementation, the retransmission probability σ is an installation-related parameter. The retransmission probability p, in one implementation is a fixed value. In another implementation, the retransmission probability p is selectable by the system. Because the retransmission probability p is used by the mobile terminal responsive to a feedback acknowledgment indicating unsuccessful communication, the retransmission probability p can also be controlled by the network infrastructure by controlling when a feedback acknowledgment is broadcast to the mobile terminal. During, for instance, a period of high traffic, the system can vary the retransmission probabilities p and σ in order for the random access to increase throughput, hence decrease the delay of the packet.

In these and other aspects, therefore, apparatus, and an associated method, is provided for selectably effectuating retransmission of a packet of data by a terminal operable in a communication system to a remote station. A first retransmission probability indicator is at least coupled to receive an indication of a first retransmission probability. The first retransmission probability is representative of a consecutive retransmission rate at which to retransmit the packet of data. A retransmission scheduler is coupled to the retransmission probability indicator to receive a value representative of the first retransmission probability. The retransmission scheduler is further coupled to receive an indication of when a previous transmission of the packet of data occurred and to receive an indication when a feedback acknowledgment of receipt at the remote station of the previous transmission of the packet of data is determined at the terminal. The retransmission scheduler selects when to retransmit the packet of data responsive to the value of the first retransmission probability subsequent to the previous transmission of the packet of data and prior to receiving the indication when the feedback acknowledgment is detected at the mobile terminal.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENT

Figure 1:
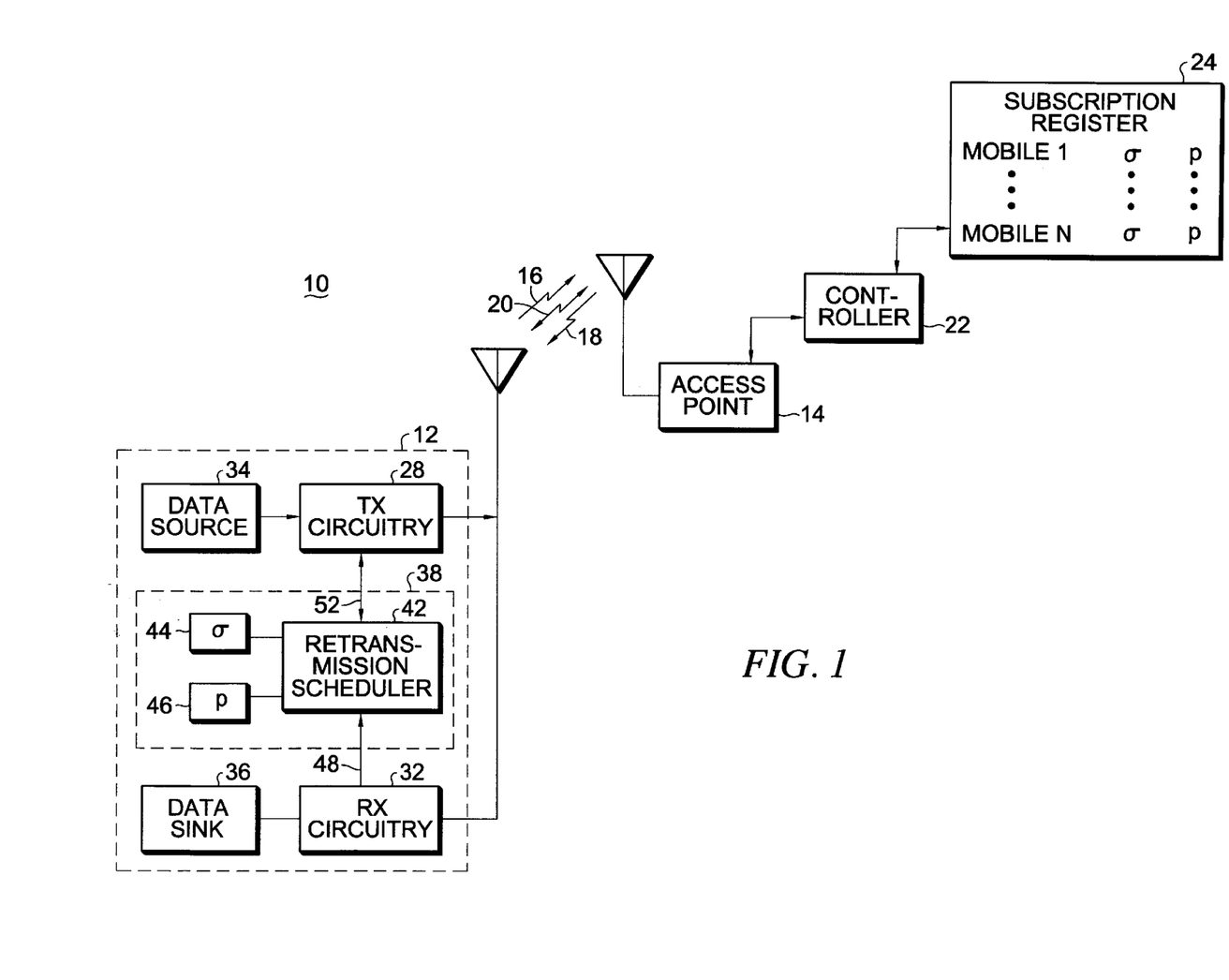
FIG. 1 illustrates a functional block diagram of a communication system in which an embodiment of the present invention is operable.

Referring first to FIG. 1, a communication system, shown generally at 10, provides for the communication of packet data between a mobile terminal 12 and an access point (AP) 14. The communication system 10 forms a multi-user communication system in which the mobile terminal 12 forms one of a plurality of sending stations capable of sending a packet of data upon a random access channel (RACH) 16. In the exemplary implementation, the communication system 10 forms a radio communication system in which the random access channel 16 is defined upon a radio link formed between the mobile terminal 12 and the access point 14. In other implementations, other types of communication systems can similarly be shown. Here, the mobile terminal 12 is representative of a sending station operable to send a packet of data, Such as a request packet, upon a random access channel, and the access point 14 is representative of a receiving station operable to receive the packet of data and to return a feedback acknowledgment indicating whether the packet of data has been successfully communicated thereto. The feedback acknowledgment returned by the access point 14 is here transmitted on a broadcast channel (BCH) and/or inband control channel (IBCH) 18 wherein the feedback acknowledgment indicates at least whether the packet data has been successfully communicated thereto, or whether the transmission attempt has been unsuccessful, such as due to the occurrence of a collision during transmission of the packet of data to the access point or other communication error necessitating retransmission of the packet of data by the mobile terminal. The feedback acknowledgment, in another implementation, is transmitted upon an inband control channel (IBCH). More generally, the feedback acknowledgment is communicated at the first portion of a MAC (medium access control) frame. Uplink (ULCH) and downlink (DLCH) channels 20 are also defined in the system for communicating data between the mobile terminal and the access point.

In the exemplary implementation shown in the Figure, the communication system is representative of a wireless LAN (local area network) Such as that set forth in the ETSI-promulgated BRAN (broadband radio access network) system. Other packet communications systems can be similarly shown. Here, the access point 14 is installed at a location, such as the interior of a building structure to permit communications with mobile terminals, such as the mobile terminal 12, when positioned within the coverage area defined by the access point 14. While not separately shown, other access points are positioned to define other coverage areas, for instance at different floors of a building structure, or different portions of a single floor at the building structure, might have separate coverage areas. The access point 14 is here shown to be coupled to a controller 22, operable to control communications in the communication system. The controller, may, in turn, be coupled to other communication systems, such as macrocellular communication system, a PSTN (public-switched telephonic network), a TCP/IP network, or the like. A subscription register is functionally represented in the Figure, connected to the controller 22. The subscription register is, for instance, contained within the controller 22 or the contents of the register are otherwise accessible by the controller 22 during operation of the communication system.

The mobile terminal 12 includes transmitter circuitry 28 and receiver circuitry 32. Data sourced at a data source 34 is provided to the transmitter circuitry, and the transmitter circuitry is operable to convert the data sourced at the data source into a form to be transmitted as packets on the random access channel 16. The receiver circuitry is operable to detect and act upon signals transmitted to the mobile terminal, including the feedback acknowledgments broadcast to the mobile terminal at a first portion of a MAC frame, such as upon the broadcast channel 18 or upon an IBCH. The receiver circuitry 32 is coupled to a data sink 36 to which the receiver circuitry provides data formed during operation of the receiver circuitry.

The mobile terminal further includes a controller 38 coupled to both the transmitter and receiver circuitry 28 and 32 respectively. The controller 38 is operable to control operation of the mobile terminal and, in one implementation, is formed of a processor, together with associated circuitry at which algorithms are executable to control the operation of the mobile terminal. The controller is here shown to include a retransmission scheduler 42, here shown as a functional element. The functions of a retransmission scheduler 42, are carried out, for instance, by algorithms executable by the processor of which the controller 38 is formed in an exemplary implementation. The retransmission scheduler is coupled to a retransmission probability $\sigma$ indicator 44 and to a retransmission probability p indicator 46. In an exemplary implementation, the indicators 44 and 46 are formed as storage elements at which values representative of the retransmission probabilities $\sigma$ and p are stored. During operation of the retransmission scheduler, such values are accessed and utilized to determine, with the appropriate corresponding probability, when to permit retransmission of a packet of data.

The retransmission scheduler 42 is coupled to the receiver circuitry by way of the line 48, here representing, a path by which indications of feedback acknowledgments delivered to the mobile terminal by way of, e.g., the broadcast channel (BCH) and/or inband control channel (IBCH) 18 are provided to the retransmission scheduler. The line 52 extending between the transmitter circuitry 28 and the transmission selector is here representative of a path by which to provide the retransmission scheduler with indications of when a packet of data is transmitted by the transmitter circuitry upon the random access channel 16.

The retransmission scheduler is operable, responsive to values of the retransmission probabilities indicated by the indicators 44 and 46, to determine when to schedule, with a probability corresponding to the value of $\sigma$ and p, retransmission of a packet of data upon the random access channel.

In the exemplary implementation, the retransmission scheduler is operable responsive to detection of an indication that a packet of data has been transmitted to select retransmission of the packet of data with a probability of $\sigma$ in the absence of detection of confirmation that the prior transmission of the packet of data has been successfully completed. The retransmission scheduler is further operable, in the exemplary implementation, responsive to detection of a feedback acknowledgment indicating unsuccessful communication also to select retransmission of the packet of data with a probability of p.

In one implementation, the values of the retransmission probability $\sigma$ and p are installation parameters, that is, installed permanently at the mobile terminal. Alternately, the new value of the retransmission probability p is generated by the mobile terminal by a selected retransmission scheme, such as an exponential back-off scheme. In another implementation, when the mobile terminal is registered to be operable in the communication system 10, such as during powering-up of the mobile terminal, values of the retransmission probabilities associated with the mobile terminal stored at the subscription register 24 are accessed and downloaded to the mobile terminal to be stored at the indicators 44 and 46.

Because the retransmission scheduler selects retransmission of a packet of data according to the retransmission probability $\sigma$ without waiting for a feedback acknowledgment indicating unsuccessful communication, retransmission of the packet data, depending upon the value of the retransmission probability $\sigma$ is permitted more quickly than that permitted in a conventional packet data system. Lower access delays of packet data and total throughputs of improved rates are possible through utilization of an embodiment of the present invention.

Figure 2:
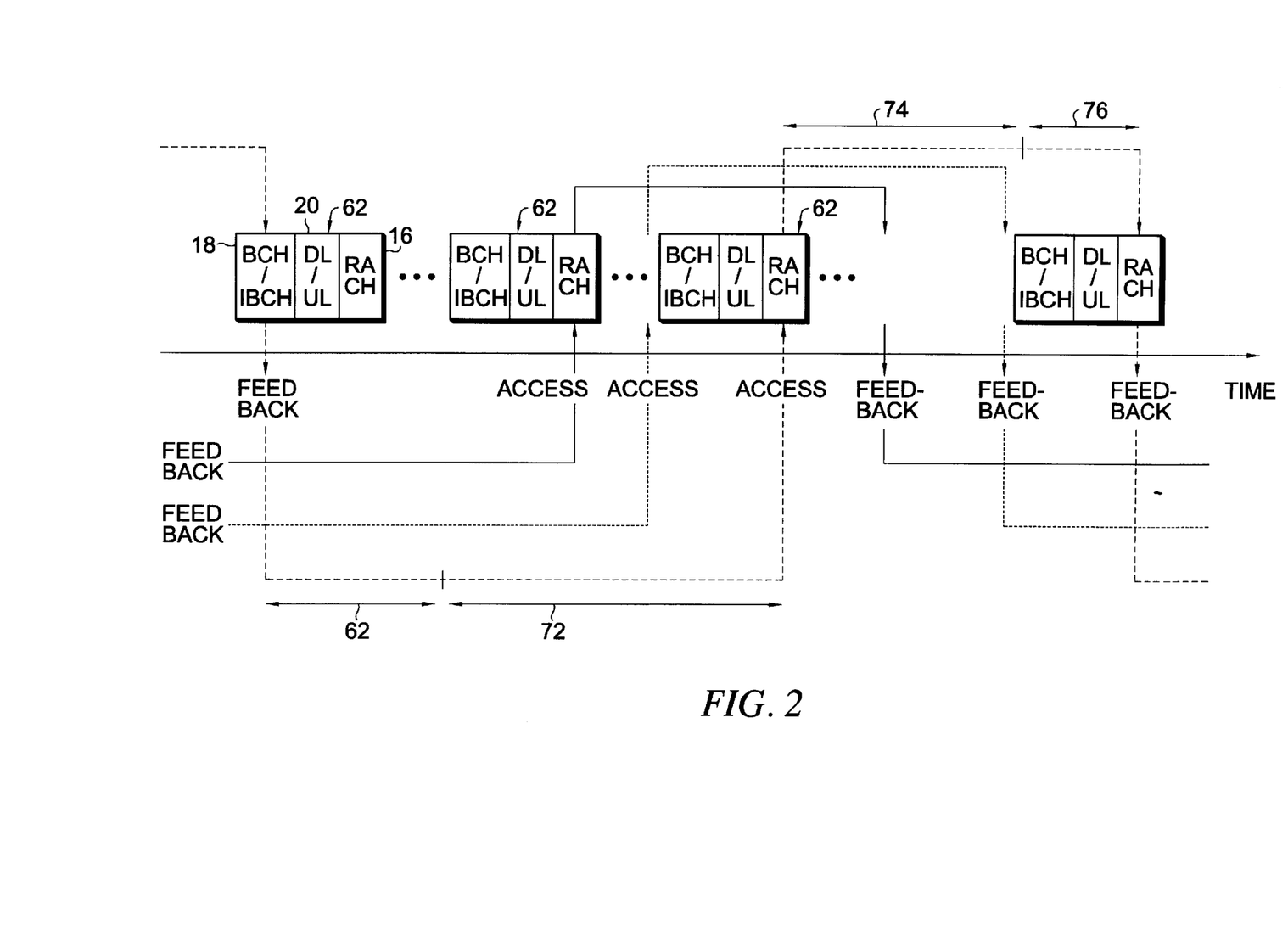
FIG. 2 illustrates a frame structure pursuant to which data is communicated in the communication system shown in FIG. 1, together with indications of signals generated during operation of an embodiment of the present invention.

FIG. 2 illustrates a plurality of MAC (medium access control) frames 62 defined in the aforementioned EPSI-promulgated BRAN standard. The BRAN standard defines a TDD (time division duplex) channel scheme. Here, each frame includes broadcast channels (BCH) and/or inband control channels (IBCH) 18, down-link (DL) channels, DLCH and up-link (UL) channels (ULCH) 20 and a random access channel (RACH) 16. IBCH can be transmitted in BCH or Downlink (DL); thus BCH and IBCH are separately shown in the Figure. While the series of frames 62 shown in the Figure are non-adjacent, additional ones of the frames positioned between the ones illustrated in the Figure can also be represented. A feedback acknowledgment, here indicated at 66, is broadest on the BCH or IBCH 18 responsive to an earlier-transmitted packet of data by the mobile terminal (shown in FIG. 1). Here, the feedback acknowledgment indicates a unsuccessful communication. Once received at the mobile terminal, a period of time, here indicated by the segment 68, is required at the mobile terminal to process the acknowledgment. Thereafter, according to the retransmission probability p, is the packet of data retransmitted upon the RACH 16 of a subsequent frame. The random delay associated with the retransmission probability p is indicated by the segment 72 in the Figure. Delays associated with the wait for receiving a feedback acknowledgment 66, and processing time required to process the feedback acknowledgement indicated by the segment 68, and thereafter the delay associated with the retransmission probability p, indicated by the segment 72 all lessen optimal levels of data throughput.

The Figure also illustrates a required processing time, indicated by the segment 74, required at the access point 14 (shown in FIG. 1) subsequent to reception of a transmitted packet of data. The processing time is required to determine whether the informational content of the packet of data is recoverable. And, yet additional delay, here indicated by the segment 76 is sometimes required until the feedback acknowledgment is returned upon a BCH or IBCH 18 of a next-succeeding frame 62.

The delays associated with the processing times at the mobile terminal and at the access point indicated by the segments 68 and 72, respectively, and also the frame delay indicated by the segment 76 result in a delayed feedback acknowledgment transmission scheme. If retransmission of the packet of data is delayed until a feedback acknowledgment is received at the mobile terminal, significant levels of delay might occur prior to successful completion of transmission of a packet of data.

FIG. 3 again illustrates the MAC frames 62, defined in the BRAN system. Here, the frames are numbered N−1, N, N+1, N+2, . . . , S, S+1, S+2, etc. Each of the frames is again shown to be formed of an RACH 16, a BCH or IBCH 18, and DLCH and ULCH 20. For purposes of simplicity, the processing time and frame delay indicated in FIG. 2 by the segments 74 and 76, here occupies a MAC frame 62.

Figure 3:
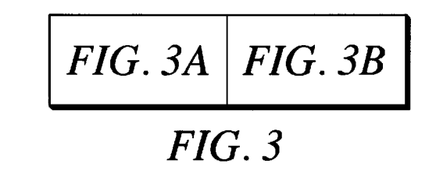
FIG. 3 illustrates the frame structure shown in FIG. 2 and the generation of signals during exemplary operation of an embodiment of the present invention.
Figure 3A:
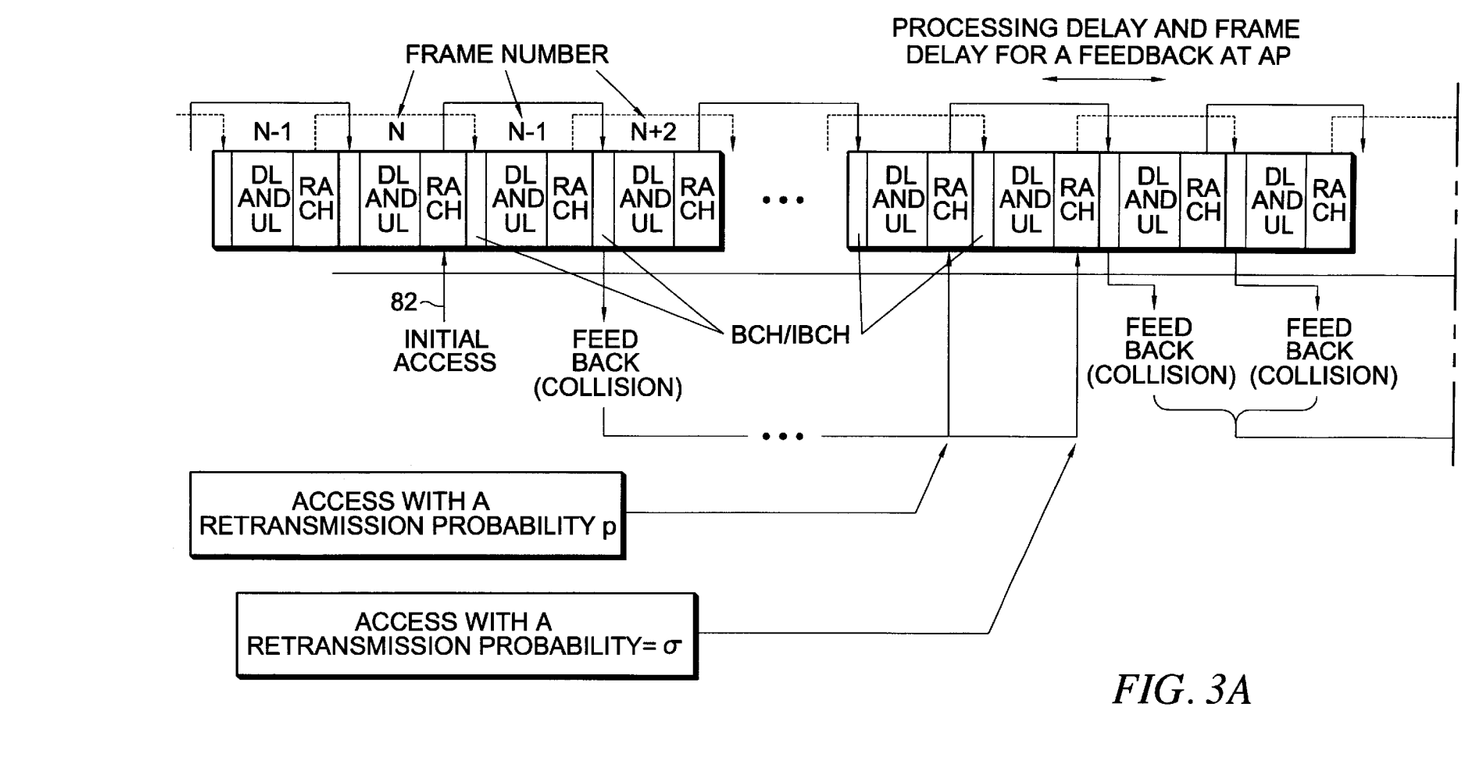
Figure 3B:
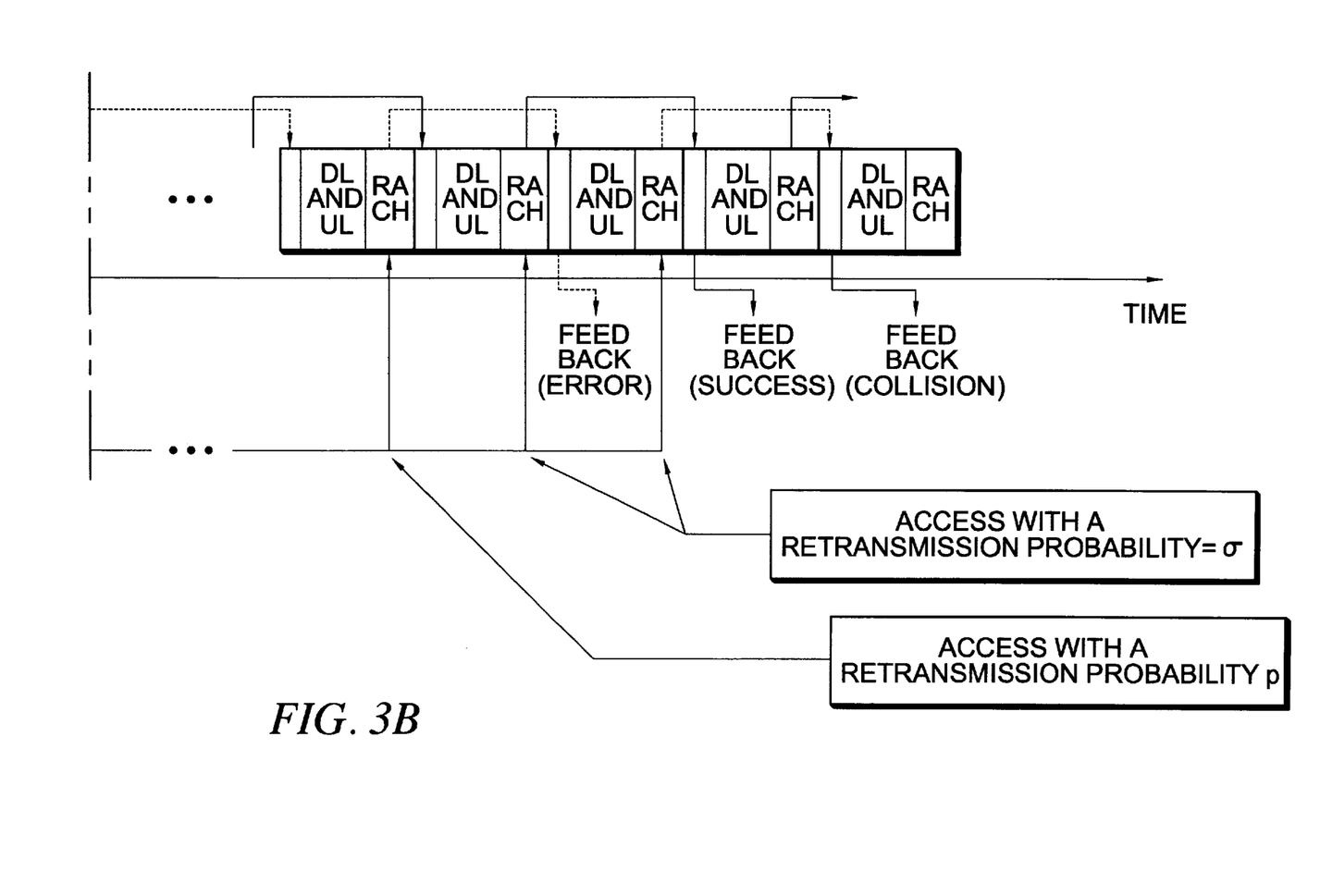

Exemplary operation of an embodiment of the present invention described with respect to an initial transmission of a packet of data, indicated by the initial access 82 upon an RACH of frame number N.

Subsequent to a delay associated with processing time at the access point and a frame delay, a feedback acknowledgment is returned to the mobile terminal upon the BCH or IBCH of frame number N+2.

Once the status of the feedback acknowledgment is detected at the mobile terminal and recognized thereat, retransmission of the packet of data occurs according to a retransmission probability p, retransmission occurs subsequent to the processing time required at the mobile terminal, indicated in FIG. 2 by segment 68. The retransmission is scheduled with the retransmission probability p, retrieved by the retransmission scheduler 42 from the indicator 46, shown in FIG. 1.

Additionally, according to an embodiment of the present invention, retransmission of the packet of data is also caused to be effectuated with the retransmission probability σ. The retransmission scheduler 42, shown in FIG. 1, retrieves the value of σ from the indicator 44, also shown in FIG. 1, to effectuate such retransmission. Such retransmission is here shown to occur at the frame S+1.

When a feedback acknowledgment indicates successful completion of a transmission of a packet of data, the mobile terminal need not retransmit the packet of data. However, when the feedback acknowledgment indicates unsuccessful communication, the mobile terminal either continues to retransmit the packet of data according to this procedure or discards the packet subsequent to expiration of a selected time period.

The retransmission of a packet of data according to the probability p requires detection at the terminal of a feedback acknowledgment indicating unsuccessful communication. Conversely, retransmission of the packet of data with the probability σ occurs in the absence of detection of successful completion of a prior transmission of the packet of data and is here transmitted at the frame S+1.

The exemplary operation further shown in the Figure indicates that a feedback acknowledgment, indicating again unsuccessful communication of the packet of data, is returned upon the broadcast channel or inband control channel of frame S+2. Retransmissions occur until a feedback acknowledgment is detected indicating successful completion of a prior transmission of the packet of data or expiration of a selected time period.

In one implementation, the retransmission probability p is a fixed value, and in another implementation, the retransmission probability p is a variable value. When a variable value, the retransmission probability p can be selected depending upon traffic conditions in the communication system.

Also according to an embodiment of the present invention, the value of the retransmission probability σ is selected according to the priority assigned to the mobile terminal, or the type of communication being effectuated by the mobile terminal. A lower-priority granted to a particular mobile terminal provides for a lower level of access to that terminal to retransmit a packet of data. With respect to data throughput, a large value of the retransmission probability σ is used for low traffic load conditions. A small value of the retransmission probability σ is used for high traffic load conditions. On the other hand, the access delay is influenced by the value σ, thus, the probability σ is set to be a large value for a time-critical packet of data.

Figure 4:
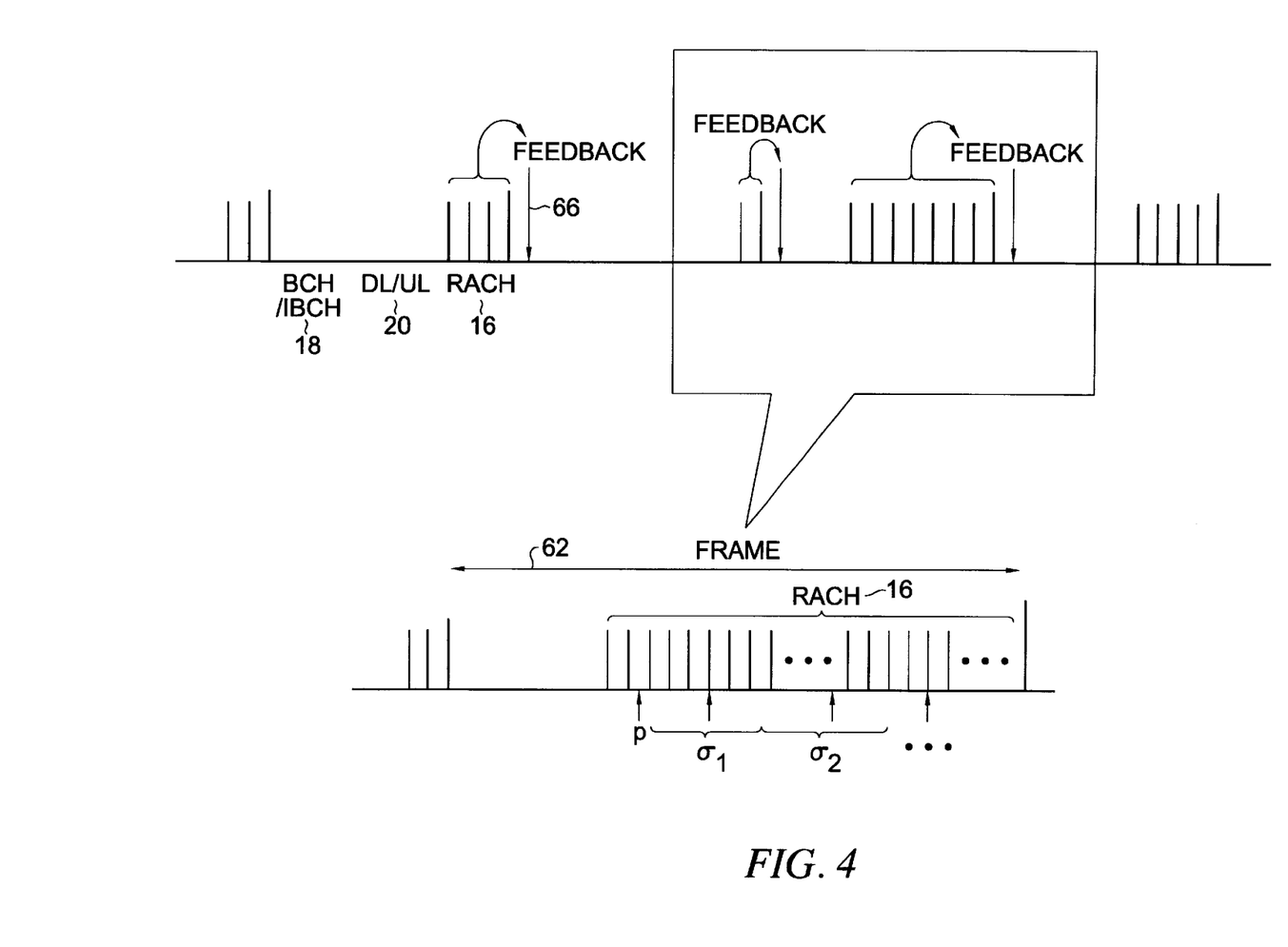
FIG. 4 illustrates a portion of the frame structure shown in FIG. 3 representing alternate operation of an embodiment of the present invention.

FIG. 4 illustrates a portion of a frame 62 defined in the aforementioned BRAN standard. Here, the RACH 16 is shown to include plurality of time slots. A packet of data can be transmitted upon any of the time slots. Because of the large number of time slots, the retransmission scheduler 42 (shown in FIG. 1) can also select transmission of a packet of data and the retransmission probability p within a single frame and also retransmit the packet of data according to the retransmission probability σ within the same frame, on a different time slot. In further embodiments, and as illustrated, more than one retransmission probability, here denoted σ1 and σ2, etc., can be selected to cause retransmission according to such additional retransmission probabilities within a single frame. The values of the different retransmission probabilities are stored at, and provided to, the retransmission scheduler at the indicator 44. The values of the retransmission probabilities σ1, σ2, etc. should be selected so that σ1 is greater than σ2 is greater than σ3, etc. In the embodiment, therefore, consecutive retransmission using the probability σ is eefectuated not only in a succeeding frame, as described above with respect to FIG. 3, but also within the same frame. Such consecutive retransmission is effectuated until the mobile terminal receives a feedback acknowledgement indicating successful completion of transmission of the packet of data.

FIG. 5 again illustrates the frames 62 defined in the BRAN system. Again, the frames are numbered with the frame number designations N−1, N, N+1, N+2, . . . S, S+1, S+2, S+3. Here, exemplary operation of an embodiment of the present invention also takes into account the possibility that broadcast of a feedback acknowledgment might occur upon a non-ideal channel. Error might be introduced into the acknowledgment. For instance, the broadcast channel or inband control channel could be susceptible to noise, co-channel interference, or multi-path fading. In the event that erroneous feedback acknowledgments are detected at the mobile terminal, and such acknowledgment erroneously indicates successful indication of a packet of data, the retransmission scheduler continues to cause retransmission of the data until a feedback acknowledgment of correct value is received. And, once the mobile terminal detects correct values of a feedback acknowledgment, the retransmission scheduler stops transmission of the packet of data.

Figures 5, 5A:
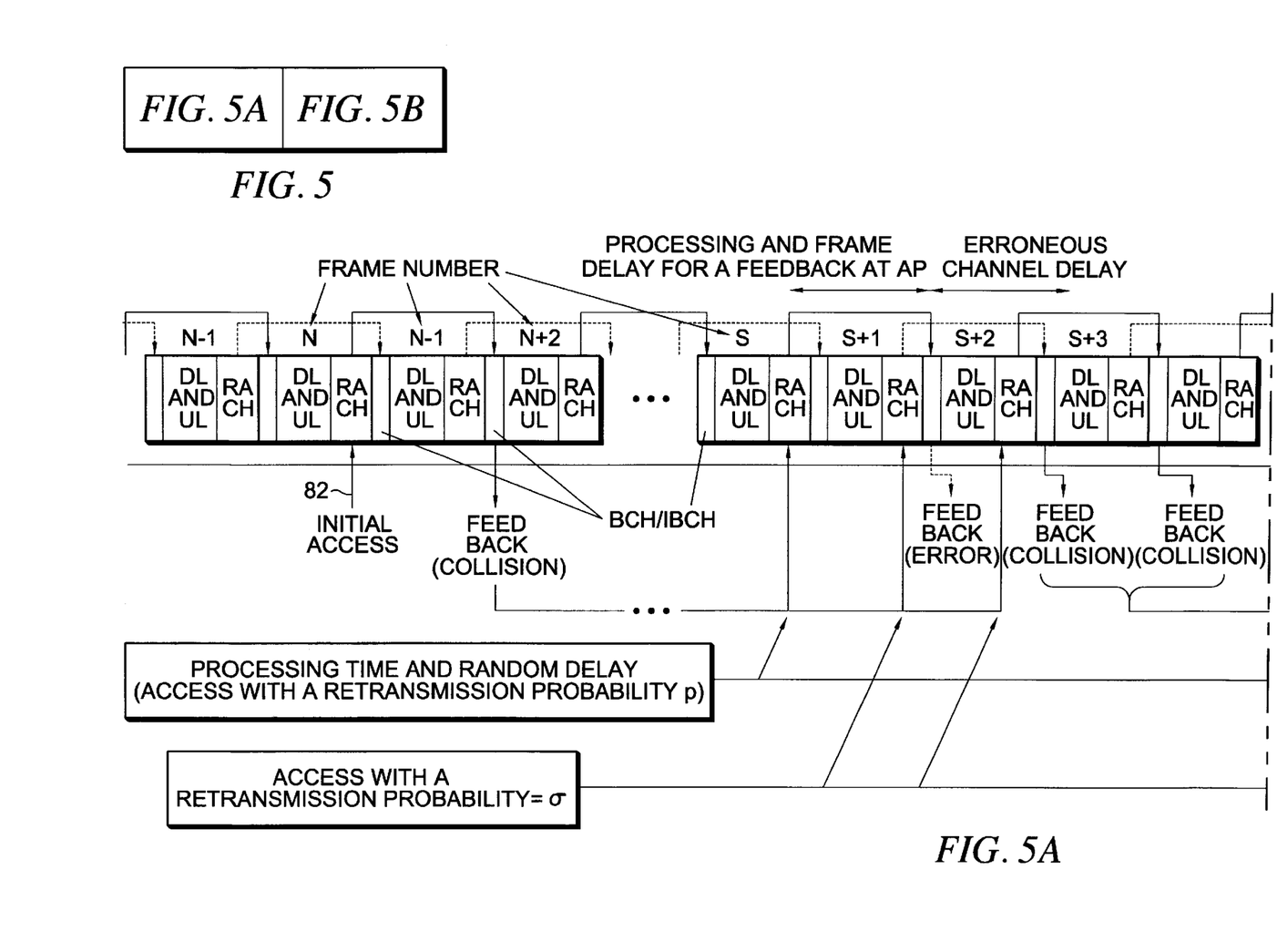
FIG. 5 illustrates the frame structure shown previously in FIGS. 2–3, here representing further exemplary operation of an embodiment of the present invention.
Figure 5B:
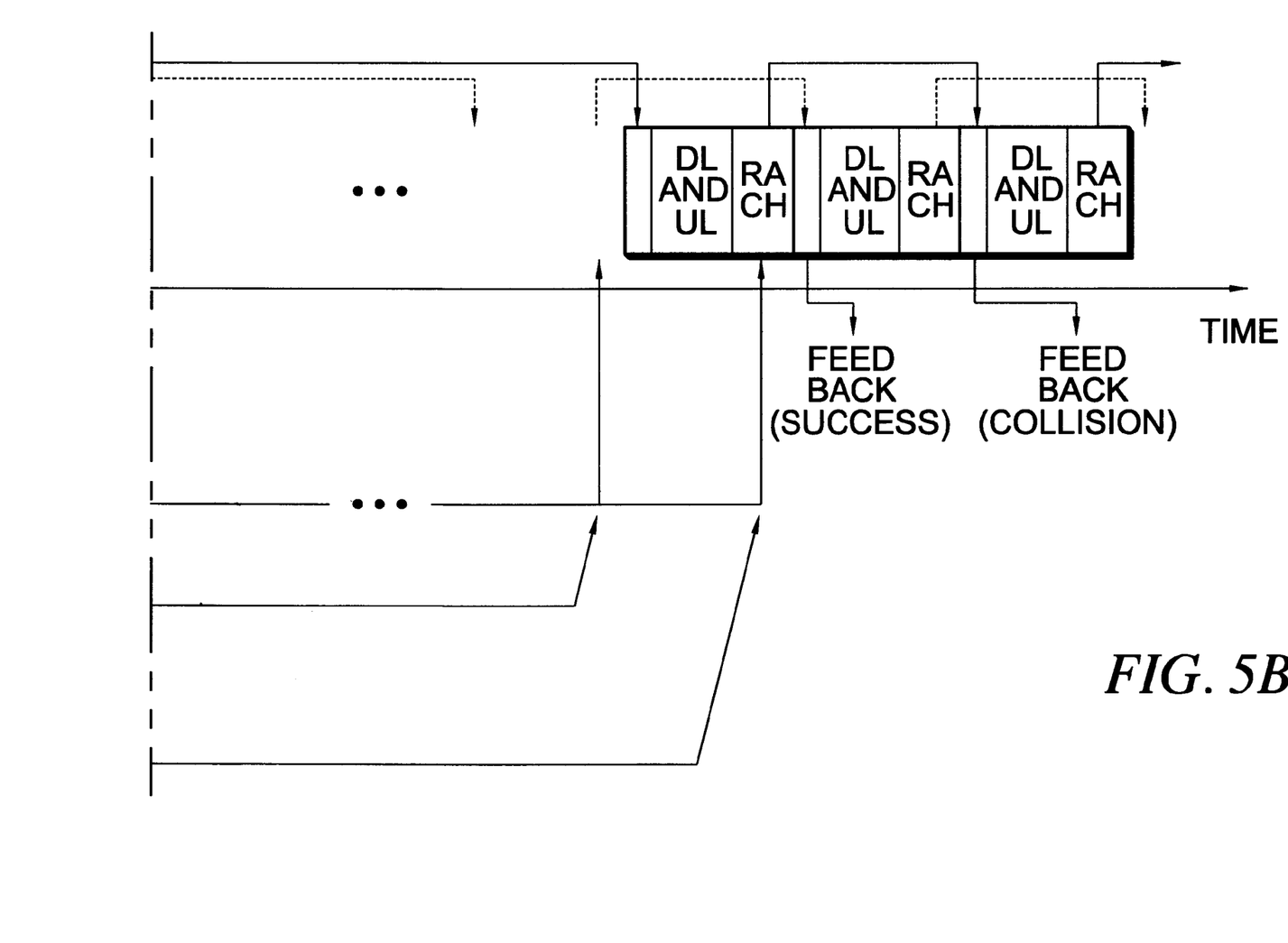

Also in this Figure, the packet of data is first transmitted at frame N, as indicated by the initial access 82. Again, there is a delay of a single frame, due to processing time and frame delay, and a feedback acknowledgment is broadcast upon the BCH or IBCH of frame N+2. Here, the feedback acknowledgment indicates unsuccessful communication and retransmission is scheduled by the retransmission scheduler with a retransmission probability p. The mobile terminal retransmits the packet of data on the RACH of frame S. The packet of data is also retransmitted at the frame number letter S+1 with the retransmission ability σ. Although the access point transmits a feedback acknowledgment upon the BCH or IBCH of frame S+2, such feedback acknowledgment is distorted, or otherwise interfered with, to be erroneous such that the mobile terminal cannot receive the feedback at the frame number S+2. Consequently, the retransmission scheduler will cause retransmission of the packet of data with the probability σ until the feedback acknowledgment is received correctly. Once the mobile terminal receives the feedback acknowledgment, other procedures follow as those described above with respect to FIG. 3. Therefore, in spite of an increase of retransmission traffic, operation of an embodiment of the present invention compensates for erroneous feedback in order to reduce access delay times.

FIG. 6 illustrates again the frames 62 defined in the BRAN system. Exemplary operation of an embodiment of the present invention is shown in this Figure to show consecutive retransmission following erroneous feedback. The retransmission scheduler here causes retransmission of a packet of data until the feedback acknowledgment indicates successful transmission in spite of having received the feedback acknowledgment. When mobile terminals are prioritized, access delay times are more sensitive to higher priority users than throughput. Therefore, the mobile terminal causes retransmission of the erroneous packet of data with the retransmission probability σ just after the first retransmission according to the retransmission probability p. Operation also overcomes the erroneous feedback because the feedback acknowledgement indicating successful communication is the only important feedback acknowledgment to stop further retransmission.

Figure 6:
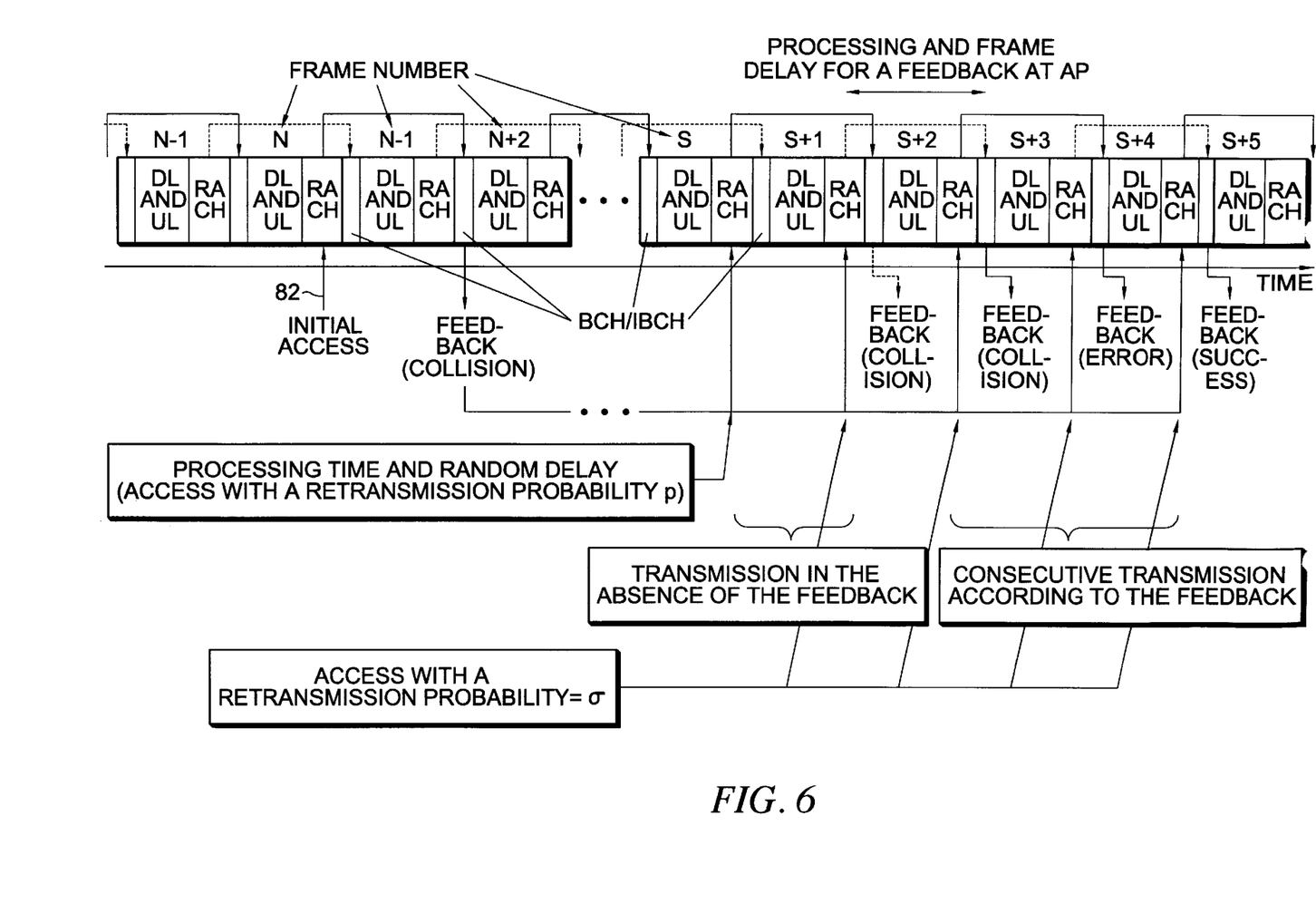
FIG. 6 illustrates the frame structure shown previously in FIGS. 2–3, here illustrating further exemplary operation of an embodiment of the present invention.

Again, initial transmission of the packet of data is indicated at the initial access 82 upon the RACH of frame N. And, a delay of a single frame due to processing time and frame delay results in a feedback acknowledgment being broadcast by the access point at frame N+2. The feedback acknowledgment at frame N+2 indicates a unsuccessful communication. Thereafter, the retransmission or schedules retransmission of the packet with the retransmission probability p. The mobile terminal retransmits the packet of data at the frame S. Continuously, the packet is retransmitted at the frame S+1 with the retransmission probability σ because of the processing and frame delay. After subsequent feedback, at frame S+2 responsive to the first transmission, here again indicating a unsuccessful communication, additional retransmissions of the packet of data are consecutively retransmitted with the retransmission probability σ until a feedback acknowledgment indicates successful completion of the communication. In addition, the mobile terminal also ignores erroneous feedback acknowledgments, of which an erroneous feedback acknowledgment is indicated at the frame S+4. Again, in spite of increase of retransmission traffic, decrease in the access delay for high priority users is possible.

Figure 7:
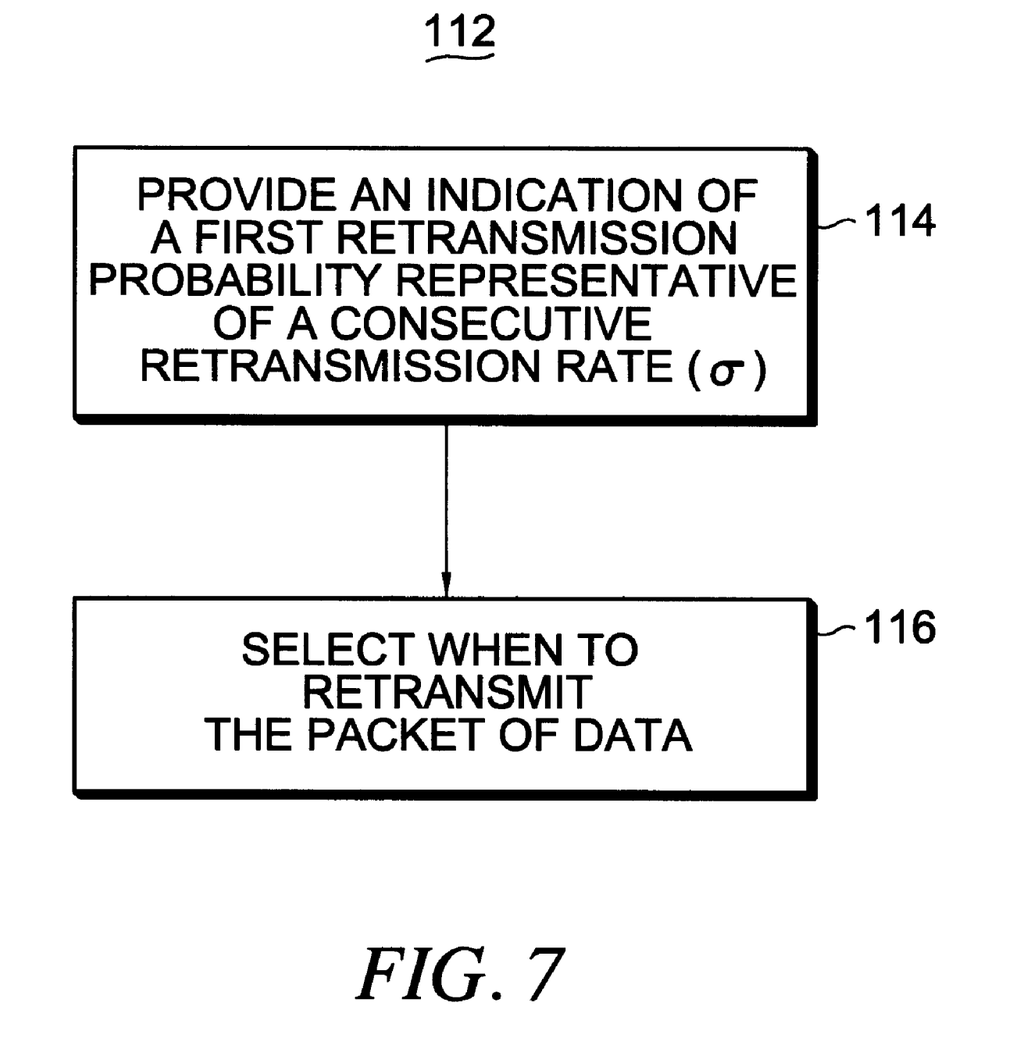
FIG. 7 illustrates a method flow diagram listing the method of operation of an embodiment of the present invention.

FIG. 7 illustrates a method, shown generally at 112, of an embodiment of the present invention. The method 112 selectively effectuates retransmission of a packet of data by a terminal to a remote station in a communication system. The system is operable in a manner in which a feedback acknowledgment is returned by the remote station is acknowledge receipt of successful delivery of a prior transmission of the packet data.

First, and as indicated by the block 114, an indication of a first retransmission probability representative of a consecutive retransmission rate to retransmit the packet of data is provided.

Then, and as indicated by the block 116, a selection is made as to when to retransmit the packet the data responsive to the value of the first retransmission probability subsequent to the prior transmission of the packet of data and prior to detection at the mobile terminal of return of the feedback acknowledgment.

The previous descriptions arc of preferred examples for implementing the invention, and the scope of the invention should not necessarily be limited by this description. The scope of the present invention is defined by the following claims.

I claim:

1. In a terminal operable in a communication system to transmit a packet of data to a remote station, the remote station operable to reply with a feedback acknowledgment acknowledging whether the packet of data is successfully received at the remote station, an improvement of apparatus for selectably effectuating retransmission of the packet of data, said apparatus comprising:

a first retransmission probability indicator at least coupled to receive an indication of a first retransmission probability representative of a consecutive retransmission rate at which to retransmit the packet of data; and a retransmission scheduler coupled to said retransmission probability indicator to receive a value representative of the first retransmission probability, coupled to receive an indication of when a previous transmission of the packet of data occurred, and coupled to receive an indication whether the feedback acknowledgment acknowledging receipt at the remove station of the previous transmission of the packet of data is detected at the terminal, said retransmission scheduler for selecting when to retransmit the packet of data responsive to the value of the first retransmission probability subsequent to the previous transmission of the packet of data and prior to receiving the indication of detection of the feedback acknowledgment at the terminal.

2. The apparatus of claim 1 wherein the terminal comprises a mobile terminal, wherein the communication system comprises a radio communication system, the mobile terminal operable in the radio communication system pursuant to a service subscription and wherein the first retransmission probability is a service-subscription-related parameter.

3. The apparatus of claim 2 wherein the mobile terminal registers with the radio communication system pursuant to a registration procedure and wherein the indication of the first retransmission probability is downloaded to the mobile terminal during the registration procedure.

4. The apparatus of claim 1 wherein said first retransmission probability indicator comprises a storage element for storing a value representative of the indication of the first retransmission probability and wherein said retransmission scheduler retrieves the values stored at the storage element.

5. The apparatus of claim 1 further comprising a second retransmission probability indicator at least coupled to receive an indication of a second retransmission probability, the second retransmission probability representative of a collision-representative retransmission rate at which to retransmit the packet of data.

6. The apparatus of claim 5 wherein said retransmission scheduler is further coupled to receive a value representative of the second retransmission probability and when the feedback acknowledgment indicates unsuccessful communication of the packet of data said retransmission scheduler for further selecting when to retransmit the packet of data responsive to the value of the second retransmission probability, subsequent to receiving the indication of the feedback acknowledgment indicative of the unsuccessful communication.

7. The apparatus of claim 5 wherein the second retransmission probability is of a fixed value and wherein said second retransmission probability indicator comprises a storage element for storing the fixed value of which the second retransmission probability value is formed.

8. The apparatus of claim 7 wherein the second retransmission probability is of a variable value, selectable during operation of the radio communication system.

9. The apparatus of claim 8 wherein the terminal comprises a mobile terminal, wherein the communication system comprises a radio communication system, wherein, when the feedback acknowledgment is indicative of unsuccessful communication of the packet of data, the value of the second retransmission probability is further responsive, at least in part, to the feedback acknowledgment.

10. The apparatus of claim 1 wherein the terminal comprises a mobile terminal, wherein the communication system comprises a TDD (time division duplex), radio communication system in which a frame structure is defined, each frame of the frame structure having a rear portion containing, a random access channel and a front portion, and wherein said retransmission scheduler selects when to retransmit the packet of data upon the random access channel.

11. The apparatus of claim 10 wherein the feedback acknowledgment, the indication of which said retransmission scheduler is coupled to receive, is transmitted upon the front portion of the frame.

12. The apparatus of claim 1 wherein the communication system comprises a wireless LAN (local area network), wherein the remote station comprises an access point of network infrastructure of the wireless LAN and wherein the first retransmission probability to which said first retransmission probability indicator is coupled to receive is a service-related parameter of the wireless LAN.

13. The apparatus of claim 1 wherein the feedback acknowledgment, to which said retransmission scheduler is, in part, responsive, is transmitted by the remote station to the terminal upon a radio channel, the feedback acknowledgment of an unsuccessful communication value representative of unsuccessful communication of a previous transmission of the packet of data or of a detection-acknowledgment value representative of successful communication of the previous transmission of the packet of data.

14. The apparatus of claim 13 wherein the radio channel upon which the feedback acknowledgment is transmitted is susceptible to distortion-causing characteristics to interfere with communication of the feedback acknowledgment to cause the feedback acknowledgment, when detected at the terminal, to be of an error value, the error value indicating unsuccessful communication of the packet of data.

15. A method for selectably effectuating retransmission of a packet of data by a mobile terminal to a remote station in a radio communication system in which a feedback acknowledgment is returned by the remote station to acknowledge whether a prior transmission of the packet of data is successfully received at the remote station, said method comprising:
  providing an indication of a first retransmission probability representative of a consecutive retransmission rate at which to retransmit the packet of data; and
  selecting when to retransmit the packet of data responsive to the value of the first retransmission probability subsequent to the prior transmission of the packet of data and prior to detection at the mobile terminal of return of the feedback acknowledgment indicating whether the prior transmission is successfully received at the remote station.

16. The method of claim 15 comprising the additional operation, prior to said operation of selecting, of providing an indication of a second retransmission probability representative of an unsuccessful-communication-responsive retransmission rate at which to retransmit the packet of data.

17. The method of claim 16 wherein, when the feedback acknowledgment indicates unsuccessful communication of the prior transmission of the packet of data, said operation of selecting further comprises selecting when to retransmit the packet of data responsive to the value of the second retransmission probability subsequent to receiving the indication that the feedback acknowledgment is detected at the mobile terminal.

18. The method of claim 16 wherein the second retransmission probability is a fixed value.

19. The method of claim 15 further comprising the initial operation of downloading the indication of the first retransmission probability from the remote station to the mobile terminal.

20. Apparatus for selectively initiating retransmission of a packet of data by sending terminal to a remote station in a communication system, the remote station operable to reply with a feedback acknowledgment, said apparatus comprising:
  a detector coupled to receive an indication of the feedback acknowledgment, the feedback acknowledgment of a value indicating whether a prior transmission of the packet of data has been received at the remote station;
  a first retransmission probability indicator for indicating a value of a first retransmission probability representative of a consecutive retransmission rate at which to retransmit the packet of data; and
  a retransmission scheduler coupled to said detector and to said first retransmission probability indicator, said retransmission scheduler for selecting when to retransmit the packet of data responsive to the value of the first retransmission probability of said detector fails to detect the feedback acknowledgment to indicate successful delivery of the prior transmission of the packet data to the remote station.

* * * * *